Patented Dec. 15, 1942 2,305,466

UNITED STATES PATENT OFFICE 2,305,466

PROCESS FOR PREPARATION OF α-HYDROXY-β,β-DIMETHYL-γ-HYDROXY BUTYRIC ACID OR γ-LACTONE

Herbert E. Carter, Urbana, Ill., assignor to Abbott Laboratories, North Chicago, Ill., a corporation of Illinois No Drawing. Application January 2, 1941, Serial No. 372,906

6 Claims. (Cl. 260—344)

The present invention is directed to an improved process for preparing α-hydroxy-β,β-dimethyl-γ-hydroxy butyric acid or its corresponding γ-butyrolactone.

The substituted butyric acid or lactone of the present invention is of particular value as an intermediate and is of special interest at the present time because of its use in the synthesis of the therapeutic pantothenic acid. Previously proposed processes for preparing the acid or lactone intermediate have been found inefficient and generally commercially unsatisfactory.

The principal object of the present invention is to provide the art with an efficient and practical process for preparing α-hydroxy-β,β-dimethyl-γ-hydroxy butyric acid or its γ-lactone.

Other objects will be apparent as the description hereinafter proceeds.

I have discovered an improved process for preparing the desired intermediate which comprises generally the use of crude α-methylolisobutyraldehyde, the formation of the cyanohydrin or butyronitrile reaction product, followed by the hydrolysis of the reaction product. I have also discovered that this process is free from the disadvantages of prior processes and that this the process of the present invention gives excellent yields of a commercially satisfactory product.

The following detailed example will serve to illustrate a preferred process of the present invention.

Example

About 102 grams of crude α-methylolisobutraldehyde—M. P. about 70°–80° C. (prepared for example by evaporation of an ether extract of the isobutyraldehyde-formalin-potassium carbonate reaction mixture) is first dissolved in about 1 liter of water warmed to about 60°–70° C. and the resulting solution cooled. A second solution is next prepared by dissolving about 133 grams of calcium chloride in 500 c. c. of water, cooling well and then adding thereto about 98 grams of potassium cyanide. The calcium chloride-potassium cyanide solution is then added at once to the cooled α-methylolisobutyraldehyde solution and nitrogen gas bubbled through the resulting reaction mixture for a few minutes.

The alkaline reaction mixture containing the butyronitrile intermediate is next allowed to stand, e. g. in a stoppered flask at a temperature of about 30°–45° C. for about 15–18 hours. After standing, the reaction solution is then heated on a steam cone to 70°–80° C., about 151 grams of oxalic acid (dihydrate) are added, and the mixture shaken for a few minutes. The calcium oxalate formed is filtered off, about 5 c. c. of concentrated hydrochloric acid is added and the solution concentrated to a gum on a water pump in accordance with the usual practice.

The gummy residue is then extracted with dry acetone, the potassium chloride filtered off, an equal volume of dry benzene added and the solution again concentrated to a gum. The residue is once again taken up in dry acetone, filtered, if necessary, and the acetone distilled on the water pump. Fractional distillation of the residue yields the pure lactone derivative distilling at about 125°–130° C. at 18 mm. pressure.

The distilled product obtained by the above process is in the lactone form and contains the usual anhydro-ring. If the acid form is desired, it may be obtained directly from the reaction solution by separation of the hydrolyzed product from the reaction mixture.

It will be understood that the present invention is not limited to the above example. In place of potassium cyanide, for example, other alkali metal cyanides may be used while in place of calcium chloride other alkaline earth metal halides may be used as desired. The hydrolysis of the cyanohydrin which takes place during standing may also be carried out at various temperatures below the boiling point of the reaction solution, e. g. 30°–100° C. The optimum standing time needed for complete hydrolysis for any particular hydrolysis temperature may be readily ascertained by preliminary experimental test. It will also be understood that the separation, purification, etc., of the hydrolyzed reaction product as described in the example are merely illustrative and that the present invention is not limited thereto. Other well known purification procedures or various modifications of the described procedure, for example, may be used as desired.

It will be obvious to those skilled in the art that the present invention is not limited to the illustrated example. Various modifications of the process falling within the scope of the present invention are intended to be covered by the following claims.

I claim:

1. In the process of preparing compounds selected from the group consisting of α-hydroxy-β, β-dimethyl-γ-hydroxy-butyric acid and its corresponding γ-lactone, the step which consists in reacting in aqueous solution methylolisobutyraldehyde with an alkali metal cyanide in the presence of an alkaline earth metal halide to form the cyanohydrin reaction product.

2. In the process of preparing compounds selected from the group consisting of α-hydroxy-β, β-dimethyl-γ-hydroxy-butyric acid and its corresponding γ-lactone, the step which consists in preparing γ-hydroxy-β, β-dimethyl-γ-hydroxy-butyronitrile by reacting α-methylolisobutyraldehyde with alkali metal cyanide in the presence of calcium chloride in aqueous solution.

3. In the process of preparing compounds selected from the group consisting of α-hydroxy-β, β-dimethyl-γ-hydroxy-butyric acid and its corresponding γ-lactone, the steps which consist in reacting in aqueous solution α-methylolisobutyraldehyde with an alkali metal cyanide in the presence of an alkaline earth metal halide to form the cyanohydrin reaction product, and then hydrolyzing the cyanohydrin product in the alkaline reaction mixture at a temperature of about 30°–100° C.

4. In the process of preparing compounds selected from the group consisting of α-hydroxy-β, β-dimethyl-γ-hydroxy-butyric acid and its corresponding γ-lactone, the steps which consist in preparing α-hydroxy-β, β-dimethyl-γ-hydroxy-butyronitrile by reacting α-methylolisobutyraldehyde with alkali metal cyanide in the presence of calcium chloride in aqueous solution, and then hydrolyzing the resulting butyronitrile product in the alkaline reaction mixture at a temperature of about 30°–45° C.

5. In the process of preparing compounds selected from the group consisting of α-hydroxy-β, β-dimethyl-γ-hydroxy-butyric acid and its corresponding γ-lactone, the steps which comprise reacting in an aqueous solution α-methylolisobutyraldehyde with an alkali metal cyanide in the presence of an alkaline earth metal halide to form the cyanohydrin reaction product, hydrolyzing the cyanohydrin product in an alkaline reaction mixture at a temperature substantially below the boiling point of said mixture, and then separating the butyric acid compound from the reaction mixture.

6. In the process of preparing α-hydroxy-β, β-dimethyl-γ-butyrolactone, the steps which comprise preparing α-hydroxy-β, β-dimethyl-γ-hydroxy-butyronitrile by reacting crude α-methylolisobutyraldehyde with potassium cyanide in the presence of calcium chloride in aqueous solution, hydrolyzing the butyronitrile product in the alkaline reaction mixture at a temperature of about 30°–45° C., separating the hydrolyzed product from the reaction mixture and fractional distilling the resulting product to obtain the desired γ-lactone in substantially pure form.

HERBERT E. CARTER.